United States Patent [19]
Curbelo et al.

[11] Patent Number: 5,166,749
[45] Date of Patent: Nov. 24, 1992

[54] STEP SCANNING TECHNIQUE FOR INTERFEROMETER

[75] Inventors: Raul Curbelo, Lexington; David B. Johnson, Needham, both of Mass.

[73] Assignee: Bio-Rad Laboratories, Hercules, Calif.

[21] Appl. No.: 704,304

[22] Filed: May 22, 1991

[51] Int. Cl.$^5$ .............................................. G05B 1/06
[52] U.S. Cl. .................................... 356/346; 318/640
[58] Field of Search ................ 356/346; 318/640; 250/338.1

[56] References Cited

U.S. PATENT DOCUMENTS 4,444,501 4/1984 Schwiesow .................... 356/346

FOREIGN PATENT DOCUMENTS 0389115 9/1990 European Pat. Off. .

OTHER PUBLICATIONS

P. Connes et al., "Astronomical Fourier Spectrometer", Applied Optics, vol. 14, No. 9, Sep. 1975, pp. 2067-2084.
M. Smith et al., "Step Scan Interferometry in the . . .," Applied Spectroscopy, vol. 42, No. 4, 1988, pp. 546-555.

Primary Examiner—Samuel A. Turner
Assistant Examiner—Richard E. Kurtz
Attorney, Agent, or Firm—Townsend & Townsend

[57] ABSTRACT

A fast and effective way to step a relative position quantity by a reference interval. Each step in relative position includes open-loop and closed-loop control intervals. The invention contemplates an actuator capable of changing the relative position and a closed loop servo that acts on the actuator to keep the relative position centered on the nearest one of a series of reference values separated by the reference interval. The actuator is preferably capable of a fast response. Stepping the relative position is accomplished as follows, assuming an initial condition where the servo has locked the relative position to a particular initial reference value. First, the actuator is caused to change the relative position by an amount approximately equal to the reference interval in a manner that the servo cannot track the change, such as by disabling the servo. Servo control is then re-established, at which point the servo operates to keep the relative position centered on the nearest reference value. Servo control is maintained until a new step is required, at which time the process is repeated.

37 Claims, 2 Drawing Sheets

STEP SCANNING TECHNIQUE FOR INTERFEROMETER

BACKGROUND OF THE INVENTION

The present invention relates generally to scanning movable elements, and more specifically to techniques for performing step scanning in an interferometer used in a Fourier transform spectrometer.

A Fourier transform spectrometer typically includes an interferometer into which are directed an infrared beam to be analyzed and a monochromatic beam that provides a position reference. The interferometer has a fixed mirror and a coil driven movable mirror. In rapid scanning, the movable mirror is driven at a nominally constant velocity over a portion of its travel; in step scanning, the movable mirror is moved intermittently. Each of the input beams is split at a beam splitter with one portion traveling a path that causes it to reflect from the fixed mirror and another portion traveling a path that causes it to reflect from the movable mirror. The portions of each beam recombine at the beam splitter, and the recombined beams are directed to appropriate detectors.

The optical interference between the two beam portions causes the intensity of the monochromatic beam and each frequency component of the infrared beam to vary as a function of the component's optical frequency and the mirror position. The detector output represents the superposition of these components and, when sampled at regular distance intervals, provides an interferogram whose Fourier transform yields the desired spectrum.

In a rapid scan interferometer, when the mirror is moved at a constant speed, the monochromatic beam provides a nominally sinusoidal reference signal whose zero crossings occur each time the moving mirror travels an additional one quarter of the reference wavelength (i.e., for each half wavelength change of retardation). The data acquisition electronics are triggered on these zero crossings to provide regularly sampled values for the interferogram. With the appropriate choice of mirror velocity, the output signal can be made to fall within a convenient range of modulation frequencies, as for example in the audio range. It is known practice to use a servo to lock the monochromatic signal to a fixed clock in order to maintain the mirror speed constant.

It is not always necessary to sample at every zero crossing. The usual requirement (Nyquist's theorem) is that the sampling occur at twice the maximum frequency in the spectral range of interest. For longer wavelengths, it is common practice to sample at every nth zero crossing where n is a small integer. It may also be desired on some occasions to undersample, in which case the sampling would not be at every zero crossing. Thus the reference interval between reference positions may be the distance between zero crossings, or an integral multiple thereof.

In a step scan interferometer, the movable mirror is moved from one reference point to the next and then stopped, at which point an intensity measurement is made. The sequence is then repeated until the desired interferogram has been acquired. The prior art teaches various techniques for accomplishing this under servo control. One approach uses quadrature detection (two sinusoids at 90° relative phase) to provide position and direction information, and changes the reference to allow stepping from one zero crossing to another (possibly a zero crossing of the other sinusoid). The use of quadrature detection in conjunction with a single sideband technique to obtain a sinusoid at a multiple of the reference frequency allows stepping to any of many positions between zero crossings. Another approach uses a dither and detects the fundamental frequency and the second harmonic with separate lock-in amplifiers. By switching between which amplifier provides the error signal, it is possible to step from zero crossing to zero crossing. A single step typically takes on the order of 100 ms.

Phase modulation is a technique wherein a sinusoidal signal is applied to the moving mirror to dither the position around each desired retardation. This is typically by an amount corresponding to ±90° of phase shift of the shortest wavelength in the spectral range of interest (103° is optimum). The infrared detector signal is passed through a demodulator such as a lock-in amplifier to detect the signal level at the dither frequency. While the shortest wavelength is modulated by almost 100%, the longer wavelengths are modulated to a lesser degree. The output of the lock-in amplifier at a given retardation value provides a measure of the derivative of the interferometer detector signal at that retardation. The technique has applicability in very slow scanning speeds, where it eliminates the need for the detector channel to operate at a very low frequency.

SUMMARY OF THE INVENTION

The present invention provides a fast and effective technique for stepping a relative position from a first reference value to a second reference value. As a matter of nomenclature, the term relative position is intended to include the position of an element relative to a fixed point or the relative position of two elements (either the distance between the elements or the difference of the distances of the elements from a fixed point). The technique of the invention is applicable where it is desired to repeatedly step a relative position by equal reference intervals, and also where it is desired to repeatedly step the relative position between the first and second reference values.

The invention finds particular utility in a step scanning interferometer as used in a Fourier transform spectrometer. In the context of a Fourier Transform spectrometer operated in a step scan mode, the two elements are first and second mirrors in an interferometer, the distances are the optical path lengths from the beam splitter to the respective mirrors, the relative position that is stepped is the difference between the two path lengths (half the retardation), and the reference interval is typically a quarter wavelength of the reference monochromatic beam (or a small integral multiple thereof).

According to the invention, the relative position is stepped in a sequence of alternating open-loop and closed-loop control intervals. The invention contemplates an actuator capable of changing the relative position and a closed loop servo that acts on the actuator to keep the relative position centered on the nearest one of a series of reference values separated by the reference interval. The actuator is preferably capable of a fast response.

Stepping the relative position is accomplished as follows, assuming an initial condition where the servo has locked the relative position to a particular initial reference value. First, the actuator is caused to change the relative position by an amount approximately equal to the reference interval in a manner that the servo cannot track the change. This can be accomplished, for example, by disabling the servo or by changing the relative position in a time shorter than the servo's response time. Servo control is then re-established, for example, by enabling the servo (if it had been disabled) or slowing the rate of change of the relative position to a level that the servo can track. At this point, the servo operates to keep the relative position centered on the nearest reference value, which is the one adjacent the initial reference value. Servo control is maintained until a new step is required, at which time the process is repeated.

This can be implementated in a system with two actuators, a first actuator and a second actuator, coupled in a manner that the relative position is changed by an amount equal to the superposition of the motions of the two actuators. Both actuators can be coupled to a single element. Where there are two elements, one actuator can be coupled to each element.

The second actuator is first caused to change the relative position in a first sense by an amount approximately equal to the reference interval in such a way that the servo cannot track the change. The servo thus locks the relative position to a new reference value. Thereafter, under servo control the second actuator is caused to attempt to change the relative position in the opposite sense by the same amount, but in such a way that the servo can sense the attempted change and control the actuators so as to oppose the change. Thus the servo keeps the relative position locked on the new reference value until the second actuator has returned to its original position. The entire sequence is repeated as many times as desired, subject to the operating range of the first actuator.

In a particular embodiment of a Fourier transform spectrometer, the first actuator is a coil driven linear motor coupled between the first mirror and the interferometer's fixed structure for effecting long-range motion over a scan interval of many reference intervals, and the second actuator is a piezoelectric transducer (PZT) coupled between the second mirror and the interferometer's fixed structure for effecting short-range motion over at most a few reference intervals. The servo operates to keep the path difference centered on a zero crossing.

In this embodiment the first mirror moves generally in a first direction relative to the beam splitter. The second mirror moves in a sawtooth fashion, each cycle having a first motion in a second direction, opposite the first, followed by second motion in the first direction, as follows. To effect a step, the servo is deactivated, and a voltage is applied to the PZT to move the second mirror in the second direction relative to the beam splitter so as to change the path difference by about one reference interval. The servo is reactivated, and operates to keep the path difference centered on the new zero crossing, whereupon the second mirror moves in the first direction at the same speed as the first mirror. Thus the path difference remains constant during the time that the two mirrors are moving in the same direction relative to the beam splitter. The sequence is then repeated for the next step.

The position sensor and servo operate by applying a dither voltage to the PZT, thereby modulating the path difference and thus the monochromatic reference signal. To the extent the modulation is centered on a zero crossing, the output is at the dither frequency. Departures from the dither being centered on a zero crossing manifest themselves as a second harmonic of the dither frequency, which is demodulated and passed through a low pass filter. The reference signal is passed through a high pass filter and combined with the output from the low pass filter to define an error signal. The error signal is applied to the PZT and the linear motor in a sense that tends to null the error signal and thus keep the path difference centered on a zero crossing.

A phase modulation technique according to a further aspect of the present invention includes stepping the path difference from a first reference value to a second reference value, maintaining the path difference at the second reference value under servo control for a given duration, changing the path difference from the second reference value to the first reference value, maintaining the path difference at the first reference value under servo control for a given duration, and repeating the above sequence. The servo is operated at a frequency that is different from, and typically much higher than, the frequency of the phase modulation. This allows the servo and the phase modulation to be separately optimized.

Thus the path difference is stepped back and forth a number of times between two reference values. This is done at a sufficiently high rate relative to the rate at which the pair of reference values is changed to allow the detector signal to be demodulated and filtered. A new pair of reference values is chosen and a further measurement made. The sequence is repeated as often as need to acquire the interferogram. The speed with which the stepping technique of the present invention can step from one path difference to another makes it a particularly effective way to implement phase modulation.

A further understanding of the nature and advantages of the present invention can be realized by reference to the remaining portions of the specification and the drawings.

DESCRIPTION OF THE PREFERRED EMBODIMENT

Interferometer Overview

Figure 1:
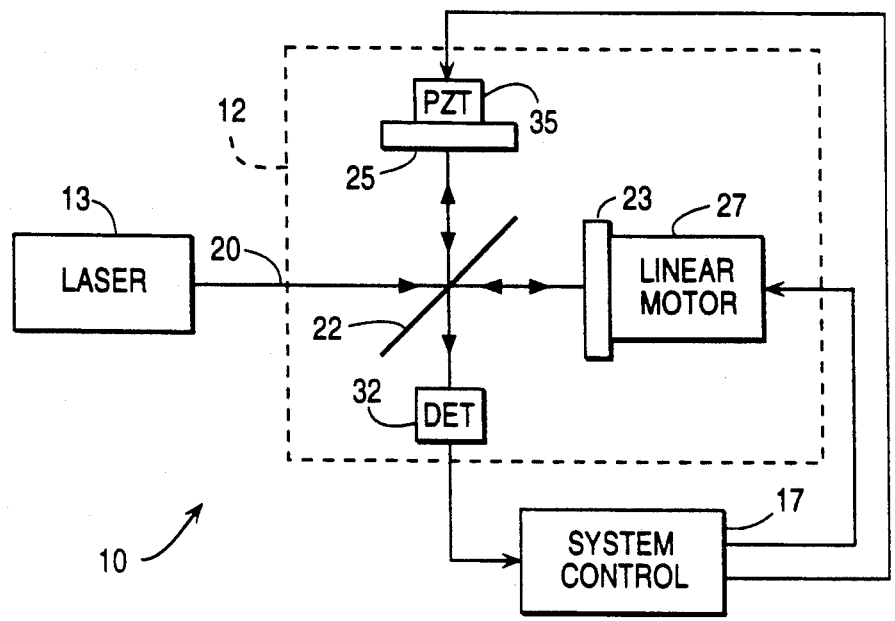
FIG. 1 is a schematic view illustrating the optical and mechanical aspects of the present invention.

FIG. 1 is a schematic view of an interferometer system 10 incorporating the step scanning control of the present invention. In a typical embodiment, the interferometer system is incorporated into a Fourier transform spectrometer, which also includes a broadband infrared source and detector, as well as data acquisition and processing circuitry. These additional elements are not part of the present invention, and will not be illustrated or described in detail.

In broad terms, the interferometer system includes an interferometer 12, a laser 15, and system control circuitry 17. Interferometer 12 comprises a beam splitter 22, a first mirror 23, and a second mirror 25. The figure shows a Michelson-type interferometer with a 90° angle between the mirrors, but many types of interferometer can be used. For example, in the specific embodiment, the mirrors are at 60° to each other. The position of mirror 23 is controlled by a linear motor 27 (solenoid drive coil and air bearing). The laser provides an beam 20 which impinges on a relatively small central portion of beam splitter 22, which central portion is optimized for the laser wavelength. The remaining portions of the beam splitter are optimized for the infrared wavelength range. System control circuit 17 provides the linear motor with an appropriate voltage waveform to drive mirror 25 in a reciprocative fashion with at least a portion of the mirror travel being at substantially constant velocity.

Input beam 20 is split at beam splitter 22 with one portion traveling a path that causes it to reflect from first mirror 23 and another portion traveling a path that causes it to reflect from second mirror 25. The beam portions recombine at beam splitter 22, and due to optical interference between the two portions, the intensity of the recombined beam is a function of the wavelength and the relative positions of the mirrors. The recombined beam is directed to a visible detector 32. A piezoelectric transducer (PZT) 35 is interposed between mirror 25 and the interferometer fixed structure.

In a particular spectrometer embodiment, provision is made to adjust the angle of mirror 25 in order to compensate for tilting of mirror 23. To this end, the detector is actually three detectors in a right triangular array and the PZT is actually three PZTs in a corresponding array. A beam expander is interposed in the output beam from laser 15 and provides an expanded input beam. Portions of this expanded beam, when recombined in the interferometer impinge on the detectors. A portion of the system control circuitry senses phase differences among the three detector signals, and on this basis provides suitable electric signals to the actuators to cause minute adjustments to the angular orientation of mirror 25 and thus compensate for wobble or systematic tilt of the mirror 23.

The use of the PZTs to stabilize the angle between the mirrors is not part of the present invention and will not be described further. However, the preferred embodiment of the present invention does rely on the ability to use the PZTs to provide translational motion of mirror 25. Accordingly, the description below will be in terms of a single detector and a single PZT. It should be understood that only one of the detectors is used to incorporate the control according to the present invention and that the three PZTs are driven in parallel to impart the desired translational motion.

The visible detector signal is used to provide a position reference for the interferogram. As noted above, the ultimate purpose of the interferometer in a Fourier transform spectrometer is to modulate each frequency component of the broadband infrared beam at its own frequency so that when the modulated beam is passed through a sample, the infrared detector signal provides an interferogram. The interferogram is sampled at fixed increments of relative mirror displacement and the digitized data is subjected to a Fourier transform to yield the desired spectrum.

When interferometer 12 is operated in a rapid scan mode, with mirror 23 moving at substantially constant velocity and mirror 25 being substantially fixed, the AC component of the visible detector signal is substantially sinusoidal, with zero crossings each time the relative distances of the mirrors from the beam splitter changes by one-quarter the laser wavelength (i.e., a zero crossing every time the retardation changes by half a wavelength). The zero crossings are used to trigger the interferogram sampling electronics. As noted above sampling may occur on only every nth zero crossing. In a step scanning mode, however, the operation is different, as will be described below.

Step Scan Control

Figure 2:
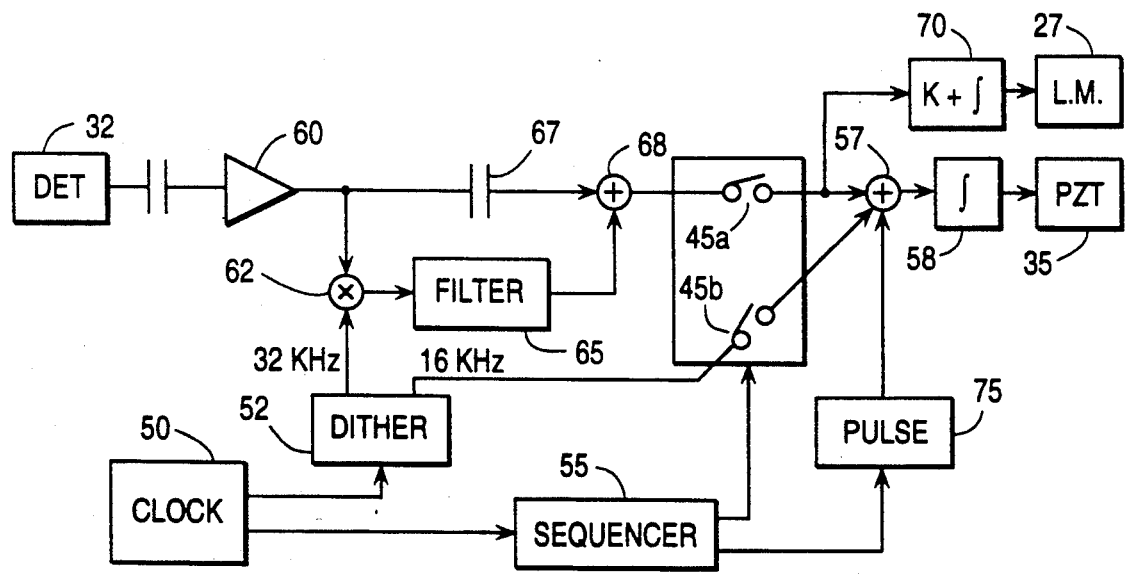
FIG. 2 is a block diagram of the system control circuitry of the present invention.

FIG. 2 is a block diagram showing the portions of system control circuitry 17 that control the mirror movement in order to establish the step scanning according to the present invention. While it is possible to achieve step scanning according to the present invention with a single actuator (the linear motor), the system with two actuators is preferred. As will be described below, the ideal behavior is that mirror 23 moves in a first direction, mirror 25 moves in a sawtooth manner, and the relative position exhibits the desired stepped profile as a function of time.

The circuitry includes a servo to lock the relative mirror position to the nearest zero crossing and dither circuitry to generate a signal for the servo. It is noted that the PZT is characterized by a faster response than the linear motor. The PZT changes mirror position in proportion to changes in voltage while the linear motor changes the mirror velocity in proportion to changes in voltage (assuming the mirror is otherwise free to move). In this particular embodiment, the control circuitry imposes a sequence of control cycles, each of which includes a first portion characterized by open-loop control and a second portion characterized by closed-loop servo control. Switches 45a and 45b are interposed in the signal paths so as to selectively deactivate the servo and the dither during the open-loop control intervals. The switches are closed during the closed-loop portion of the control cycle, and open during the open-loop portion.

As noted above, in step scanning, it is desired to hold the mirrors at a series of constant relative positions that correspond to certain (or maybe all) of the zero crossings of the detector signal. Since the relative mirror position would not be changing during the intervals that the servo is to operate, the detector signal has no AC component. While it is possible to servo to a DC signal level, DC servos are prone to drift. Since long term stability is an important criterion, it is preferred to apply a dither signal to PZT 35. This modulates the monochromatic reference signal and makes it possible to generate the error signal on the basis of AC signals. If the center of the dithered position corresponds to a zero crossing, the detector signal will show an output at the dither frequency. To the extent that the dither is not centered on zero crossing, a second harmonic of the dither signal will be present.

A master clock 50 controls dither circuitry 52 and a sequencer 55, to be described below. Dither circuitry 52 generates a 16-kHz signal that is communicated through switch 45b, a summing node 57, and an integrator 58 to PZT 35. While this dither is intentionally in the range of frequencies capable of affecting the monochromatic detector channel, it may be outside the range capable of detection by the infrared detector channel. The modulated signal as sensed by detector 32 is communicated through an AC-coupled preamplifier 60. The signal is combined with a 32-kHz synchronous demodulator reference signal at a multiplier 62 and the result passed through a low pass filter 65.

The output from filter 65 is a DC error signal component generally proportional to the amount of 32-kHz component present in the detector signal. This signal tracks changes in relative position, but due to the low pass filter necessary to generate the signal, the response is slow. However, rapid changes in the relative position are passed through a capacitor 67 (high pass filter) and combined with the low pass filter output at a summing node 68. The low pass and high pass filters cross over at about 100 Hz, which is a suitably large factor below the 16-kHz dither. Thus, the servo provides the functionality of a DC servo but requires only AC-coupled circuitry.

The resultant combined error signal is communicated through switch 45a, summing node 57, and integrator 58 to PZT 35. The combined error signal is also applied to an integrator 70 whose output is coupled to the drive coil in linear motor 27. Integrator 70 actually provides an output that is proportional to the sum of the integral of the error signal and a constant times the error signal. The latter term tends to stabilize the servo loop.

Sequencer 55 controls the stepping rate and for each step cycle defines the open-loop and closed-loop portions. The sequencer accomplishes this by opening switches 45a and 45b and causing a voltage pulse generator 75 to apply a voltage pulse through summing node to the input of integrator 58 during the open-loop portion of the cycle. Each voltage pulse is of a magnitude and duration that causes the PZT to displace mirror 25 by a distance that closely corresponds to the desired step. This step may be the distance between zero crossings of the reference signal (a relative change in mirror position of one-quarter wavelength), but is usually an integer multiple of that distance. The repetition rate of the pulses defines the stepping rate, which can be 0.25-800 steps/second in a preferred embodiment. The pulse duration is about 120 $\mu$s, which means that the duty cycle can be about 1/10 to 1/3000. The time constant of the servo is on the order of 100 $\mu$s, which means the relative position takes a few times that amount of time to settle. Thus even at the fastest stepping rate, the stepping and settling time amount to only a fraction of the total step cycle.

Sequencer 55 then closes switches 45a and 45b so that closed-loop servo control can be reestablished. It is generally preferred that the PZT return to a point near its original position before the next pulse. This could be handled by the servo alone, but that would result in relatively large error signals to bring the PZT back. It is therefore preferred, for stepping rates of 100 Hz or more, to have pulse generator 75 apply an offset voltage of opposite sense during the closed-loop portion of the cycle. This voltage should be such that the time averaged value of the voltage input to integrator 58 is approximately zero. Thus the voltage at the integrator returns to its original value by the end of each cycle (i.e., before the next pulse), and the servo only needs to generate small corrections. In order to account for possible errors in the offset voltage, integrator 58 should be somewhat leaky. Integrator 58 is characterized by a 10-ms time constant, so any residual voltage tends to disappear in about 30 ms. An alternative, used for stepping rates below 100 Hz, uses no offset voltage, but rather relies on the integrator to discharge its output voltage to a given level before the next pulse.

Figure 3A:
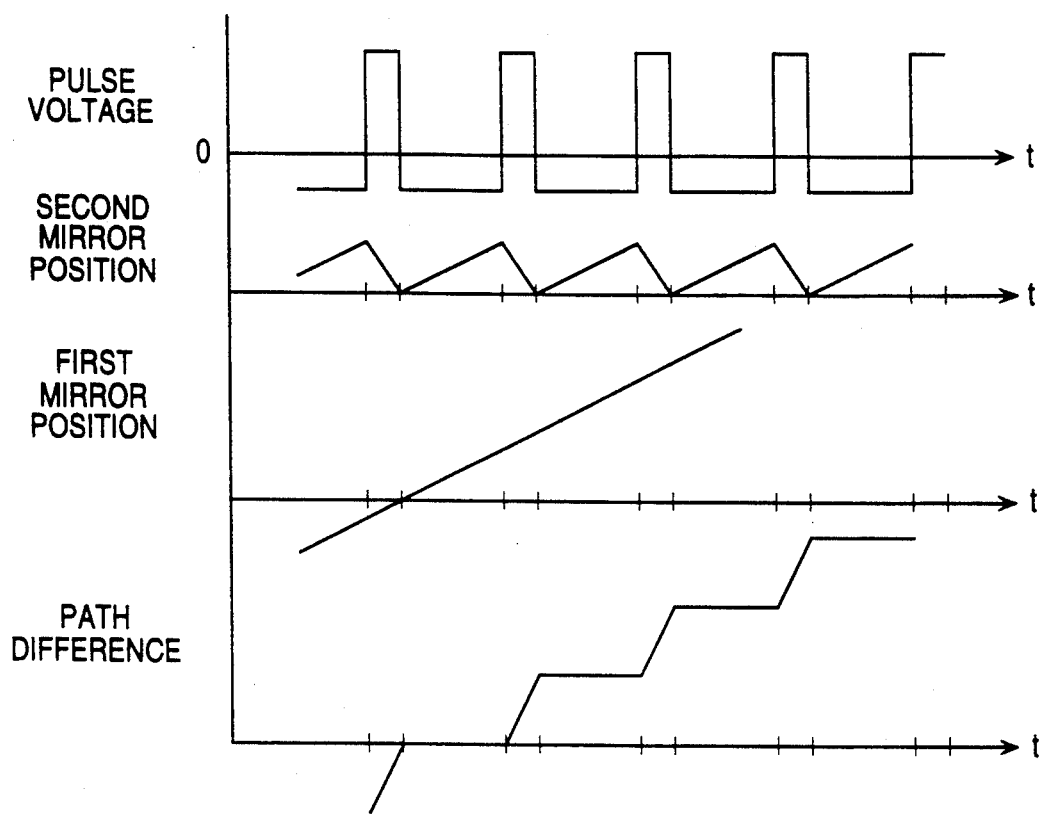
FIGS. 3A and 3B are timing diagrams, each showing the pulse voltage and absolute and relative mirror positions as a function of time.
Figure 3B:
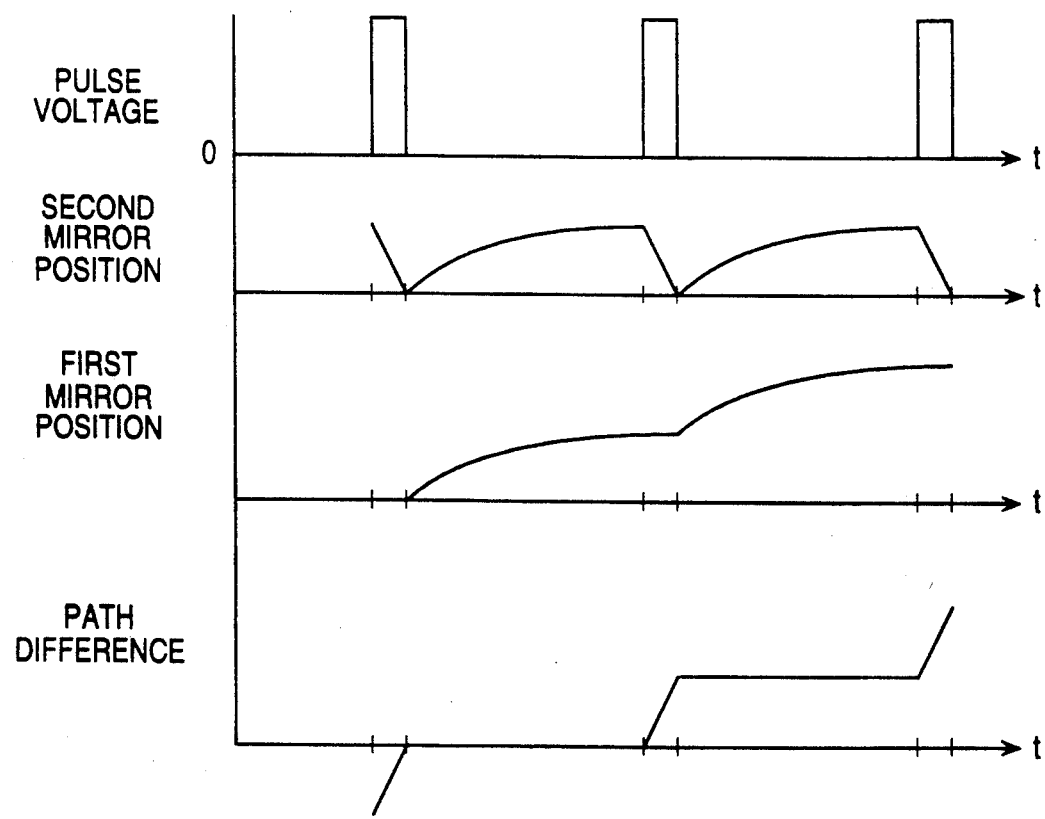

FIGS. 3A and 3B are timing diagrams for stepping rates at or above 100 Hz and below 100 Hz, respectively. Each illustrates the voltage pulses applied to integrator 58, the resultant position of mirror 25, the position of mirror 23, and the resulting path difference.

FIG. 3A shows the case where the offset voltage is applied during the entire closed-loop portion of the cycle, FIG. 3B shows the case where no offset is applied during the closed-loop portion, but rather the integrator discharges with a 10-ms time constant.

The diagrams illustrate a steady state situation that is maintained during the main portion of the scan. Prior to the illustrated time period, mirror 23 had been brought to a starting point, the system control circuitry had been enabled, and a sequence of step cycles had been commenced. It has been found that the steady state is reached in about 10 cycles. For clarity, the voltage output from pulse generator 75 is shown in both FIGS. 3A and 3B as having a relatively large duty cycle, whereas the actual duty cycle is smaller. Distances are shown as increasing in the direction away from the beam splitter. For definiteness, assume that increasing the voltage on the PZT drives mirror 25 toward the beam splitter.

In FIG. 3A, the voltage pattern consists of a series of positive pulses separated by a negative offset voltage. When integrated, this provides a rapid movement of mirror 25 toward the beam splitter during each pulse, followed by a slower movement away from the beam splitter during the offset period. During the closed-loop portion, the servo causes mirror 23 to move away from the beam splitter at a constant speed that equals the speed of mirror 25 when mirror 25 is moving away from the beam splitter. When the servo is disconnected, mirror 23 keeps moving at the same speed. Thus the relative position of the two mirrors is seen as having a stepped profile, with the steps corresponding to the pulses applied during the open-loop portions of the step cycles. The timing diagram is somewhat idealized in that it does not show the overshoot or undershoot occurring during the settling interval.

FIG. 3B shows the situation for slower stepping rates where the integrator voltage is allowed to discharge with a 10 ms time constant. After about 30 ms, the voltage resulting from the pulse has decayed and the PZT has relaxed to its original position. Thus mirror 25 remains stationary for the latter part of the longer step cycles. The servo causes mirror 23 to track the motion of mirror 25. Since mirror 23 is stationary at the beginning of the step (when the servo is disabled), it remains so until the servo is again enabled.

Phase Modulation

The interferometer is operated in a phase modulation mode by repeatedly stepping the path difference back and forth between a pair of reference values centered about a mid-position, and then stepping to a new pair of reference values 30 centered about a new mid-position. When the path difference is stepped to a given reference value, it is held at that reference value by the servo. The stepping can be effected by any suitable technique, but the stepping technique according to the present invention is particularly suitable. The fact the present invention allows rapid stepping of the path difference makes it easily possible to implement phase modulation at reasonably useful rates (i.e., rates significantly above the normal stepping rate).

In a particular embodiment, stepping is across four zero crossings of the monochromatic reference, which provides a path difference of approximately 0.6 microns or a total retardation of 1.2 microns. A step occurs every 1.2 ms, which corresponds to an alternation frequency of approximately 400 Hz. The stepping rate of such alternations must ensure a large enough number of cycles (say at least 10-20) about each mid-position value to allow appropriate demodulation. This can be accomplished if the overall stepping rate between mid-position values is less than about 20 steps per second. In this embodiment, pulses of alternating polarity are applied to the input of integrator 58, but no offset voltage is applied between pulses. The integrator discharges only slightly between pulses, thereby requiring that mirror 23 move only by small amounts.

Conclusion

In conclusion it can be seen that the present invention provides a simple and flexible technique for stepping a relative position of one or more elements.

While the above is a complete description of the preferred embodiment of the invention, namely a Michelson-type interferometer incorporated into a Fourier Transform spectrometer, alternative constructions, variations, and equivalents can be used. For example, the specific embodiment disables the servo during the rapid stepping of the PZT. However, it is also possible to leave the servo enabled, so long as the step occurs in a time short enough that the servo is unable to respond. Similarly, while the specific embodiment has the PZT interposed between mirror 25 and the fixed structure, the PZT could be interposed between mirror 23 and linear motor 27. Furthermore, while the PZT is the actuator of choice for the stepping, an alternative device such as coil, with or without a spring, could be used. The PZT is faster and stiffer however. Indeed, it would also be possible for linear motor 27 to be provided with a spring so that position rather than velocity varied linearly with voltage. Moreover, while the servo described above locks to a zero crossing by demodulating the detector signal at twice the dither frequency, thus generating an error signal that is zero at a zero crossing, this is not necessary. It is also possible to lock to a peak by demodulating at the dither frequency so as to generate an error signal that is zero at a peak.

Therefore, the above description and illustration should not be taken as limiting the scope of the invention which is defined by the claims.

What is claimed is:

1. Apparatus for stepping a relative position from a first to a second reference value, comprising:
   actuator means for effecting changes in the relative position;
   servo means, coupled to said actuator means and responsive to the relative position, for centering the relative position on the nearest reference value;
   sequencing means for defining a control cycle and a step direction, including (a) first means, operable in a first portion of the control cycle, for causing said actuator means to change the relative position in said step direction by an amount approximately equal to the separation between the first and second reference values in a manner that said servo means is unable to respond to the change while the change is occurring, and (b) second means, operable in a second portion of the control cycle, for allowing said servo means to control said actuator means and thereby center the relative position on the second reference value;
   whereupon the relative position is stepped from the first reference value to the second reference value.

2. The apparatus of claim 1 wherein said sequencing means includes means for defining a sequence of control cycles with alternating step directions, whereby the relative position is stepped back and forth between the first and second reference positions.

3. The apparatus of claim 1 wherein said sequencing means includes means for defining a sequence of control cycles, all with the same step direction, whereby the relative position is stepped to a series of reference values.

4. The apparatus of claim 1 wherein said first means includes means for uncoupling said servo means from said actuator means during said first portion of the given control cycle.

5. The apparatus of claim 1 wherein said actuator means comprises:
   a first actuator; and
   a second actuator;
   said first and second actuators being controllable such that the relative position is changed by an amount equal to the superposition of the motions imparted by said first and second actuators.

6. The apparatus of claim 5 wherein:
   said first actuator has a range of motion generally commensurate with the relative position range;
   said second actuator has a range of motion at least commensurate with the separation between adjacent reference values.

7. The apparatus of claim 5 wherein:
   the relative position is a relative position of first and second movable elements;
   said first actuator is coupled to said first element; and
   said second actuator is coupled to said second element.

8. Apparatus for stepping a relative position in a given direction to a series of equally spaced reference values over a range of relative positions that includes a plurality of such reference values, comprising:
   actuator means for effecting changes in the relative position;
   servo means, coupled to said actuator means and responsive to the relative position, for centering the relative position on the nearest reference value;
   sequencing means for defining a sequence of control cycles, including (a) first means, operable in a first portion of a given control cycle, for causing said actuator means to change the relative position in the given direction by an amount approximately equal to the separation between adjacent reference values in a manner that said servo means is unable to respond to the change while the change is occurring, and (b) second means, operable in a second portion of the given control cycle, for allowing said servo means to control said actuator means and thereby center the relative position on the closest reference value;
   whereupon the relative position is repetitively stepped from one reference value to the next in the series.

9. The apparatus of claim 8 wherein said first means includes means for uncoupling said servo means from said actuator means during said first portion of the given control cycle.

10. The apparatus of claim 8 wherein said actuator means comprises:
    a first actuator; and
    a second actuator;
    said first and second actuators being controllable such that the relative position is changed by an amount equal to the superposition of the motions imparted by said first and second actuators.

11. The apparatus of claim 10 wherein:
said first actuator has a range of motion generally commensurate with the relative position range;
said second actuator has a range of motion at least commensurate with the separation between adjacent reference values.

12. The apparatus of claim 10 wherein:
the relative position is a relative position of first and second movable elements;
said first actuator is coupled to said first element; and
said second actuator is coupled to said second element.

13. Apparatus for stepping a relative position in a first direction to a series of equally spaced reference values over a range of relative positions that includes a plurality of such reference values, comprising:
a first actuator operable to change the relative position over a range at generally commensurate with the range of relative positions;
a second actuator operable to change the relative position over a range at least commensurate with the separation between adjacent reference values;
servo means, responsive to said relative position and coupled to at least one of said actuators, for centering the relative position on the nearest reference point;
means for causing said second actuator (a) to move in the first direction by a particular distance so as to change the relative position in the first direction by an amount generally equal to the separation between adjacent reference values in a manner that said servo means does not respond to the movement in the first direction, and then (b) to move in a second direction opposite the first direction by a distance generally equal to said particular distance in a manner that said servo means responds to the movement in the second direction.

14. The apparatus of claim 13 wherein said means for causing includes means for uncoupling said servo from said second actuator during said first mentioned movement.

15. The apparatus of claim 13 wherein:
said first actuator is characterized by a velocity that varies linearly with input voltage; and
said second actuator is characterized by a position that varies linearly with input voltage.

16. The apparatus of claim 13 wherein:
said first actuator is a solenoid coil linear motor; and
said second actuator is a piezoelectric transducer.

17. The apparatus of claim 13, and further comprising:
means, coupled to said first actuator, for imposing a dither on the relative position.

18. An interferometer comprising:
a beam splitter;
first and second mirrors;
means for providing a reference signal representing the optical path difference between said mirrors' respective optical path lengths from the beam splitter, said reference signal being characterized by a reference interval and exhibiting a particular characteristic when said path difference assumes one of a number of reference values, equally spaced by the reference interval;
actuator means, coupled to at least one of said mirrors, for effecting changes in said path difference;
servo means, responsive to said reference signal, for causing said actuator means to maintain said path difference at the nearest reference value; and
sequencing means for defining a control cycle and a step direction, including (a) first means, operable in a first portion of said control cycle, for causing said actuator means to change said path difference in said step direction by an amount approximately equal to the reference intervals in a manner that said servo means is unable to respond to the change while the change is occurring, and (b) second means, operable in a second portion of said control cycle, for allowing said servo means to control said actuator means and thereby center said path difference on the closest reference value;
whereupon said path difference is stepped by the reference interval.

19. The apparatus of claim 18 wherein said sequencing means includes means for defining a sequence of control cycles with alternating step directions, whereby the relative position is stepped back and forth between the first and second reference positions.

20. The apparatus of claim 18 wherein said sequencing means includes means for defining a sequence of control cycles, all with the same step direction, whereby the relative position is stepped to a series of reference values.

21. The apparatus of claim 18 wherein:
said first actuator is a coil driven linear motor; and
said second actuator is a piezoelectric transducer.

22. The apparatus of claim 18, and further comprising:
means, coupled to said second actuator, for imposing a dither motion on said second mirror to allow said servo means to determine the extent to which the path difference differs from the nearest reference value.

23. An interferometer comprising:
a beam splitter;
first and second mirrors;
means for providing a reference signal representing the optical path difference between said mirrors' respective optical path lengths from the beam splitter, said reference signal being characterized by a reference interval and exhibiting a particular characteristic when said path difference assumes one of a number of reference values, equally spaced by the reference interval;
actuator means, coupled to at least one of said mirrors, for effecting changes in said path difference;
servo means, responsive to said reference signal, for causing said actuator means to maintain said path difference at the nearest reference value; and
sequencing means for defining a sequence of control cycles, including (a) first means, operable in a first portion of a given control cycle, for causing said actuator means to change said path difference in a given direction by an amount approximately equal to the separation between adjacent reference values in a manner that said servo means is unable to respond to the change while the change is occurring, and (b) second means, operable in a second portion of the given control cycle, for allowing said servo means to control said actuator means and thereby center said path difference on the closest reference value;

whereupon said path difference is repetitively stepped from one reference value to the next in the series.

24. The apparatus of claim 23 wherein:
said first actuator is a coil driven linear motor; and
said second actuator is a piezoelectric transducer.

25. The apparatus of claim 23, and further comprising:
means, coupled to said second actuator, for imposing a dither motion on said second mirror to allow said servo means to determine the extent to which the path difference differs from the nearest reference value.

26. An interferometer comprising:
a beam splitter;
first and second mirrors;
means for providing a reference signal representing the optical path difference between said mirrors' respective optical path lengths from the beam splitter, said reference signal being characterized by a reference interval and exhibiting a particular characteristic when the optical path difference assumes one of a number of reference values, equally spaced by the reference interval;
a first actuator for moving said first mirror over a range of many reference intervals;
a second actuator for moving said second mirror over a range of at most a small number of reference intervals;
servo means, responsive to said reference signal, for causing said first and second actuators to maintain the path difference at the nearest reference value; and
means for controlling said second actuator to cause said second mirror to undergo a sequence of first and second movements;
said first movement being a particular distance in a first direction relative to said beam splitter to effect a change in the path difference generally equal to the reference increment in a manner that prevents said servo means from controlling said second actuator to prevent said first movement;
said second movement being said particular distance in a second direction relative to said beam splitter opposite said first direction in a manner that allows said servo means to control said second actuator to prevent the path difference from changing;
whereupon the path difference changes by a reference interval during said first movement and remains constant during said second movement.

27. The apparatus of claim 26 wherein:
said first actuator is a coil driven linear motor; and
said second actuator is a piezoelectric transducer.

28. The apparatus of claim 26, and further comprising:
means, coupled to said second actuator, for imposing a dither motion on said second mirror to allow said servo means to determine the extent to which the path difference differs from the nearest reference value.

29. In a system having an actuator for effecting changes in a relative position and a servo, coupled to the actuator and responsive to the relative position, for centering the relative position on the nearest of a set of reference values, a method for stepping the relative position from a first to a second reference value comprising the steps of:
defining a control cycle and a step direction;
in a first portion of the control cycle, causing the actuator to change the relative position in the step direction by an amount approximately equal to the separation between the first and second reference values in a manner that the servo is unable to respond to the change while the change is occurring; and
in a second portion of the control cycle, allowing the servo to control the actuator and thereby center the relative position on the second reference value;
whereupon the relative position is stepped from the first reference value to the second reference value.

30. A method of performing phase modulation in an interferometer having a servo operable to maintain the retardation at a reference value, comprising the steps of:
(a) changing the retardation from a selected first reference value to a selected second reference value;
(b) maintaining the retardation at the second reference value under servo control for a given duration;
(c) changing the retardation from the second reference value to the first reference value;
(d) maintaining the retardation at the first reference value under servo control for the given duration; and
(e) repeating said steps (a)-(d).

31. The method of claim 30 wherein said steps (a) and (c) are performed at least partly outside servo control.

32. The method of claim 30 wherein the servo control is characterized by a frequency that differs from the frequency with which said steps (a)-(d) are repeated.

33. Apparatus for performing phase modulation in an interferometer, comprising:
an actuator operable to change the retardation value;
a servo operable to maintain the retardation at a reference value; and
means, coupled to said actuator and said servo, for defining a sequence of phase modulation cycles, including
means, operable in a first portion of a given cycle, for changing the retardation from a selected first reference value to a selected second reference value,
means, operable in a second portion of the given cycle, for maintaining the retardation at the second reference value under servo control for a given duration,
means, operable in a third portion of the given cycle, for changing the retardation from the second reference value to the first reference value, and
means, operable in a fourth portion of the given cycle, for maintaining the retardation at the first reference value under servo control for the given duration.

34. The apparatus of claim 33 wherein each of said means for changing includes means for uncoupling the servo from the actuator.

35. The method of claim 33 wherein the servo is characterized by a frequency that differs from the frequency with which said phase modulation cycles occur.

36. A servo for an interferometer having a detector that provides a detector signal representative of retardation and an actuator for effecting changes in retardation, comprising:
first means, responsive to the detector signal, for generating a first error signal component representing the high frequency content of the detector signal;

second means, responsive to the detector signal, for generating a second error signal component representing the direct coupled low frequency content of the detector signal; and means for combining said first and second error signal components and applying the result to the actuator so as to minimize the result.

37. The servo of claim 36 wherein said second means includes means for synchronously demodulating the detector signal.

* * * * *